Figure 1:
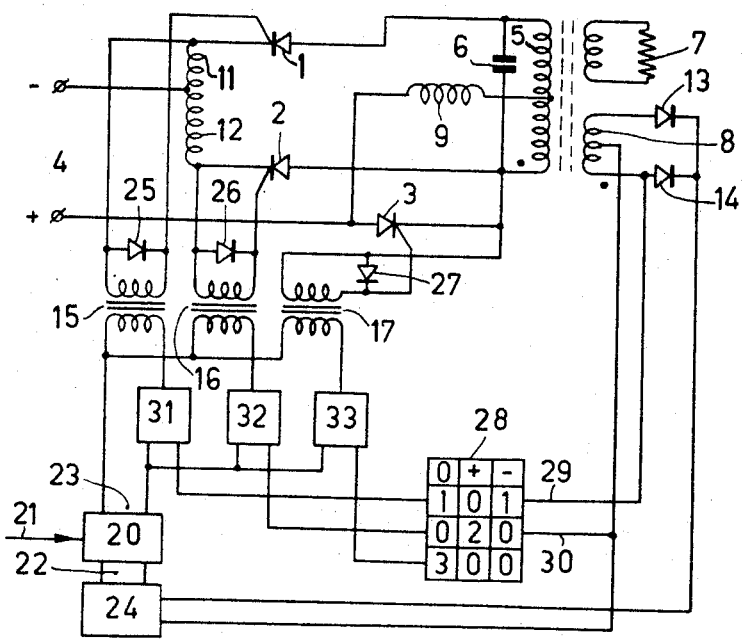

INVENTOR.
KARL H.G. LOPITZSCH

BY

AGENT

United States Patent Office 3,413,539
Patented Nov. 26, 1968

3,413,539
DIRECT CURRENT-ALTERNATING CURRENT INVERTERS HAVING A PAIR OF CONTROLLED RECTIFIERS
Karl Heinz Gustav Lopitzsch, Emmasingel, Eindhoven, Netherlands, assignor to North American Philips Company, Inc., New York N.Y., a corporation of Delaware
Filed Nov. 23, 1966, Ser. No. 596,619
Claims priority, application Netherlands, Nov. 24, 1965, 6515205
4 Claims. (Cl. 321—45)

The invention relates to a parallel-tuned direct current-alternating current inverter. This type of inverter generally includes a pair of controlled rectifiers, the main current paths of which are connected in the forward direction between a first terminal of a direct voltage supply source and the respective ends of a winding which is incorporated, at least partly, in a symmetric parallel resonant circuit that is coupled to a load. A centre tap of said winding is connected, through a choke coil, to the other terminal of the direct voltage supply source. The inverter also includes a source of pulses for controlling the rectifiers.

Such inverters are known under the name of "parallel inverters," for example, from the book "Wechselrichter and Umrichter" by W. Schilling (1940) and from Communication No. 963 of the "Proceedings of the International Conference on Semiconductor Devices" held in Paris in 1961. As is clearly explained in this article by A. E. Jackets and K. Wilson they may be constructed both as "parallel-tuned" inverters and as "series-tuned" inverters. In addition, there exists a mixed form having both series and parallel resonance, as described in a paper by Ir. J. J. Wilting in "Philips Technisch Tijdschrift" No. 7/8 of 1961, pp. 255–261.

In the series-tuned inverters and in the mixed form, the choke coil is connected to a centre tap of the winding of the output transformer and its inductance is small relative to that of each half of said winding. Each current pulse through one of the controlled rectifiers terminates with a corresponding half cycle of the current through a series-resonant circuit which is impulsed by the current pulses and consists of the choke coil and the effective capacitance of the parallel resonant circuit relative to the corresponding half of the winding. The parallel resonant circuit inter alia fulfils the function of a commutation capacitor. The current through the choke coil is a direct current which is strongly modulated with the resonant frequency of the tuned series circuit, or even a pulsatory direct current in the mixed form, and the output alternating voltage strongly depends upon the load as a result of the fact that it is produced by oscillations of a series resonant circuit.

In the parallel-tuned inverters, the inductance of the choke coil is large relative to that of each half of the winding so that in certain circumstances, the choke coil can also be connected to a point other than a centre tap of the winding of said circuit. Every current pulse through one of the controlled rectifiers ends sometime before a corresponding half cycle of an oscillating voltage produced thereby across the parallel resonant circuit. The capacitance of said circuit serves in particular as a tuning capacitor and, in addition, also as a commutation capacitor. The current through the choke coil is a direct current having a ripple component with a peak-to-peak amplitude, for example, smaller than one fourth of the average direct current, inversely proportional to the impedance of the choke coil and to the frequency of the alternating voltage produced, and the output alternating voltage depends comparatively little upon the load.

Owing to its more favourable load characteristic, the so-called parallel-tuned inverter is preferred for many applications, for example, in the case of induction heating by means of intermediate frequency currents. However, this inverter usually presents starting difficulties because the capacitor of the parallel resonant circuit can charge only slowly during the first ignition of one of the controlled rectifiers, since the increase of its charging current is limited by the large inductance of the choke coil. As a result, at the end of the first half cycle of the oscillations produced across the parallel resonant circuit, and damped principally by the load, commutation of the rectifier which was first rendered conductive does not take place because the energy accumulated in the capacitor of the parallel resonant circuit is too small to extinguish said rectifier.

In the paper by Jackets and Wilson already cited, it is proposed to prevent said difficulty, by connecting a thermistor in series with the load when starting under a heavy load. In this case, the inverter is started in a substantially unloaded condition. Alternatively, it is possible to cause the amplitude of the control pulses to increase slowly by means of an RC-network so that the more sensitive of the controlled rectifiers is first rendered conductive and the other only after several further time intervals between successive control pulses, so that sufficient energy is then present in the capacitor of the parallel resonant circuit. For this purpose one of the controlled rectifiers is usually additionally rendered artificially less conductive than the other.

In a paper by W. Berens and H. Glimski in "Fachberichte der Hauptversammlung des VDE," pp. 258–264, 1964, further methods of starting series-tuned inverters are described:

(a) A control-logic produces the conductivity of one of the rectifiers and ensures that the other can only be rendered conductive after reversal of the direction of the load current;

(b) Energization of the load by an auxiliary source of alternating voltage before starting the inverter (this is possible only if an auxiliary source of sufficient power and of the required frequency is available);

(c) Interruption of the load circuit and charging the capacitor of the resonant circuit by means of an auxiliary direct voltage source before starting the inverter; and (d) Dividing the capacitor of the resonant circuit into two symmetrical parts and loading the capacitors of said parts by means of a direct voltage source and then short-circuiting the capacitor of one of the parts through a switch and an inductance through which said capacitor is oscillatorily reversely charged. As a result, a voltage equal to twice that of the auxiliary direct voltage source suddenly becomes operative across the whole resonant circuit so that this is powerfully impulsed and the inverter is started.

However, starting of these series-tuned inverters or of the said mixed form cannot be compared directly with the starting of a parallel-tuned inverter, because they do not operate with compulsory commutation and the choke coil may even be lacking entirely.

In French patent specification 1,325,224 parallel-tuned inverter circuits are described in which the starting measures described above in paragraph c and/or d are more or less employed. Two of these circuits are comparatively complicated and comprise a large number of elements which are included in the parallel resonant circuit or are connected thereto, while the other can only be used for inductive loads having a phase angle smaller than 45° and, as a result of the measures used for facilitating starting, no longer constitute real parallel-tuned inverters, so that their output alternating voltage is presumably comparatively strongly dependent upon the load.

It is an object of the invention to provide a comparatively simple, entirely electronic and easily starting direct current-alternating current inverter of the parallel-tuned type already defined.

The inverter according to the invention is characterized in that a third controlled rectifier is connected in the forward direction between the end of the choke coil remote from the winding and one end of the winding and is controlled so that, when starting the inverter, it becomes conductive together with the controlled rectifier of the pair of rectifiers the main current path of which is connected to the other end of the winding and thus strongly accelerates the first charging of the capacitor of the parallel resonant circuit by the direct voltage supply source.

The third controlled rectifier is preferably controlled through a gate circuit which is cut off by the alternating voltage produced across the parallel resonant circuit.

In order that the invention may readily be carried into effect, one embodiment thereof will now be described in greater detail, by way of example, with reference to the accompanying drawing, in which—

Figure 2:
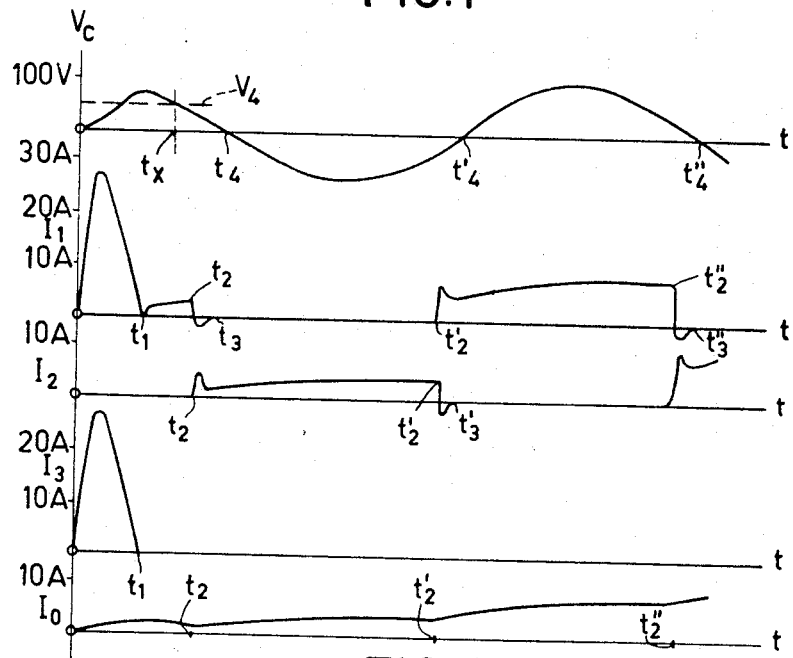

FIGURE 1 is the circuit diagram of an embodiment of the inverter according to the invention, and FIGURE 2 shows current and voltage time diagrams to explain the operation of this embodiment.

The embodiment shown diagrammatically and partly in block-schematic form in FIGURE 1 may be used, for example, for the induction heating of goods to be treated by means of intermediate frequency currents, for example, steel components to be hardened. It comprises a pair of controlled rectifiers 1 and 2 shown as controlled semi-conductor rectifiers. The main current circuits of rectifiers 1 and 2 are connected in the forward direction between a first (negative) terminal of a direct voltage supply source 4, and the respective ends of a winding 5. Together with a capacitor 6, the winding 5 constitutes a symmetric parallel resonant circuit. The winding is coupled to a load 7 and an auxiliary winding 8 includes a centre tap which is connected to the other terminal of the supply source 4 through a choke coil 9. The embodiment shown further comprises a source of pulses for controlling the rectifiers 1 and 2, which will be described hereinafter. Small induction coils 11 and 12 are connected between the cathodes of each of the rectifiers 1 and 2 and the negative terminal of the supply source 4. The object of these coils is to limit the steepness of the increase of the current when the respective controlled rectifier becomes conductive.

The inductance of the choke coil 9 is large with respect to that of each half of the winding 5 of the parallel resonant circuit 5–6, which half is closely coupled to the other half. In other words, the inverter is of the parallel-tuned type in which the frequency of the alternating voltage produced across the parallel resonant circuit is somewhat higher than and substantially equal to the natural frequency of said circuit. Inverters of this type have a very good load characteristic and are consequently highly suitable for induction heating in which strong and sudden load variations may occur. The parallel resonant circuit determines the operating frequency since the inverter is self-controlled and its fly-wheel effect, as well as the fact that the direct current flowing through the choke coil 9 is uninterrupted and shows only a comparatively weak ripple component, benefit the loading properties. However, these inverters operate with compulsory commutation, that is to say, that each controlled rectifier is rendered non-conductive as a result of the other controlled rectifier becoming conductive. The capacitor 6 of the parallel resonant circuit also plays the role of a commutation capacitor. At the instant that one of the controlled rectifiers becomes conductive it must be sufficiently charged to render the other controlled rectifier non-conductive by bringing its anode to a potential which is negative relative to that of its cathode, to absorb charge carriers which emerge from the said electrode, and nevertheless to maintain said electrode at a reverse potential during at least the whole recovery time of the controlled rectifier. This recovery time is the time which elapses between the instant at which the current through a controlled rectifier has become zero and the instant at which it has regained its cut-off properties relative to a voltage directed in the forward direction.

In operation, the capacitor 6 is repeatedly charged in the other direction through the small induction coil 11 or 12, the controlled rectifier 1 or 2 and through the lower or upper half of the winding 5 and the choke coil 9. The value of the direct current flowing through the choke coil varies very little so that, practically speaking, the impedance of the choke coil 9 does not hamper the discharging and charging of the capacitor 6.

The situation on starting the inverter is quite different. When connecting the supply source 4, nothing happens for the time being. A switching-on pulse, if any, is suppressed by the high impedance of the choke coil 9 to such an extent that, even in the case of a direct and/or strong feedback coupling, it cannot supply the energy to impulse the resonant circuit 5, 6 sufficiently strongly to produce a pulse for making one of the controlled rectifiers 1 and 2 conductive. A first starting pulse has thus to be supplied between the control electrode and the cathode of one of the controlled rectifiers 1 and 2, for example, of rectifier 1. This starting pulse renders the controlled rectifier 1 conductive and the capacitor begins to charge through the coil 11, the rectifier 1, the lower half of the winding 5 and the choke coil 9. Its lower electrode becomes positive relative to its upper electrode. However, the charging current is strongly inhibited by the comparatively high impedance of the choke coil 9, so that it can increase only very slowly. This slowly increasing current corresponds to a weak initial current pulse which may be insufficient to impulse the parallel resonant circuit 5, 6 sufficiently strongly, particularly if starting has to take place in the loaded condition. Even if the initial current pulse is sufficient to impulse strong oscillations in the parallel resonant circuit 5, 6 and to produce a pulse for rendering the second rectifier 2 conductive, the charge of the capacitor 6, at the instant the second rectifier 2 becomes conductive, is usually insufficient to render the first rectifier 1 non-conductive, to absorb the charge of said rectifier and to hold the voltage between cathode and anode of said rectifier in the reverse direction during the required recovery time. The supply source 4 is therefore substantially short-circuited through the choke coil 9 and the controlled rectifiers 1 and 2, which may thereby be damaged.

In order to overcome said starting difficulty, according to the invention, a third controlled rectifier 3 is connected in the forward direction between the end of the choke coil 9 remote from the winding 5 and the lower end of the winding 5. This third controlled rectifier is controlled by the pulse source to be described, in such manner that, when starting the inverter, it becomes conductive together with the controlled rectifier 1 of the pair of rectifiers, the main current path of which is connected to the upper end of the winding 5. Thus, the first charging operation of the capacitor 6 of the parallel resonant circuit 5, 6 by the direct voltage supply source 4, is strongly accelerated by short-circuiting the circuit consisting of the choke coil 9 and the lower half of the winding 5 by means of the third controlled rectifier 3.

The pulse source for controlling the controlled rectifiers 1, 2, and 3, substantially comprises a pulse shaper 20, for example, a monostable trigger circuit or a controlled blocking oscillator having two inputs. One input 21 receives a starting pulse, for example, by means of a battery and a push-button switch. One input 22 receives a feedback coupling voltage from the auxiliary winding 8 through a double rectifier composed of rectifiers 13 and 14, and a phase control network 24 by means of which the phase of the pulses produced by the pulse generator 20 can be varied relative to the half sinusoidal pulses of the direct voltage produced between the centre tap of the auxiliary winding 8 and the common point of the rectifiers 13 and 14. By this phase adjustment, the time between commutation and passage through zero of the voltage across the capacitor 6 may be adjusted to the value required for the recovery of the controlled rectifiers.

The output 23 of the pulse shaper 20 is connected to the primary windings of three control transformers 15, 16 and 17 through gates 31, 32 and 33, respectively. The secondary windings of said control transformers are shunted by diodes 25, 26 and 27 respectively, which suppress the negative excursions of the control pulses and are connected between the cathodes and the control electrodes of the corresponding controlled rectifiers 1, 2 and 3, respectively. The gates 31, 32 and 33 are controlled by a logical device 28 having an input 29, 30 connected to one half of the auxiliary winding 8, and outputs connected to said gates. This logical device is constructed so that the gates 31 and 33 are open as long as no voltage appears across the winding 8, so that they pass the positive pulse produced by the pulse shaper 20, as a result of a starting pulse applied at its input 21, to the control electrodes of the controlled rectifiers 1 and 3. These rectifiers are thus rendered conductive by said control pulse and the capacitor 6 is rapidly oscillatorily charged to nearly twice the voltage of the supply source 4. The capacitor charge path includes the induction coil 11, the controlled rectifier 1 and the controlled rectifier 3. This is shown in FIGURE 2 by the variation of the voltage $V_c$ across the capacitor 6 and the first peak of the currents $I_1$ and $I_3$ through the controlled rectifiers 1 and 3, respectively, during the beginning of the first half cycle of the voltage $V_c$ (until the time $t_1$). During the charging of the capacitor 6, a comparatively small increasing current $I_0$ also begins to flow through the choke coil 9, via the controlled rectifier 1 and the upper half of the winding 5. At the instant $t_1$ at which the charging current $I_3$ again passes the value zero, the controlled rectifier 3 becomes non-conductive again and is kept in the non-conductive condition by the fact that the voltage across the capacitor 6 at the instant $t_1$ and up to a later instant $t_x$ (first line of FIGURE 2) remains larger than the voltage $V_4$ of the supply source 4, so that a negative voltage is set up at the anode of the controlled rectifier 3 between the instants $t_1$ and $t_x$. The controlled rectifier 1 remains conductive after $t_1$ because, at this instant, the current $I_0$ though the choke coil 9 has already become larger than its holding current. From the instant $t_1$ the inverter begins to operate as such and the source 4 further supplies energy to the parallel resonant circuit 5, 6 through the controlled rectifier 1 and the choke coil 9.

The voltage across the auxiliary winding 8 varies of course like the voltage $V_c$ so that, for example, the upper input conductor 29 of the logical device 28 has become positive relative to the other input conductor 30 during the charging of the capacitor 6. As a result, the gates 31 and 33 are blocked, while the gate 32 is opened. The same first voltage peak across the auxiliary winding 8 is applied to the input 22 of the pulse shaper 20 through the rectifier 14 and after adjustment of its phase by the network 24. At an instant $t_2$ at which the voltage across the capacitor 6 has not yet changed sign, a second control pulse is consequently produced by the pulse shaper 20. This second pulse is applied through the gate 32 between the control electrode and the cathode of the controlled rectifier 2 and renders the said rectifier conductive. The voltage still present across the capacitor 6 is thereby applied in the reverse direction across the controlled rectifier 1, so that the said rectifier stops conducting. The charge carriers accumulated therein produce a small peak of current flowing in the reverse direction and which ceases at an instant $t_3$, still before the voltage across the capacitor 6 changes sign at the instant $t_4$.

If the first commutation just described has succeeded, which is always the case provided that the controlled rectifier 3 can recover during the time $t_1-t_x$ and the controlled rectifier 1 can recover during the time $t_2-t_4$, the actual starting is completed and the inverter further operates in the normal manner. However, a build-up phenomenon still follows because, up to the instant $t_1$, the capacitor 6 has not yet been charged to the full voltage to which it should be charged for the given direct supply voltage. This building up occurs at a relatively low frequency determined by a series resonant circuit consisting of the parallel resonant circuit with the winding 5 and the capacitor 6, and of the choke coil 9, and has a strongly attenuated character, even when the inverter is not loaded. However, it is associated with a temporary excessive voltage across the capacitor 6. It is therefore obvious not to start with the full direct supply voltage but with a supply voltage reduced to, for example, one half or even one third, so that the temporary excessive voltages occurring during the build-up do not exceed the voltages occurring during normal operation. A much smaller and cheaper type may be used for the controlled rectifier 3 than for the controlled rectifiers 1 and 2.

During the second half cycle, after a comparatively weak initial peak, the current $I_2$ through the controlled rectifier 2 increases slowly up to an instant $t_2'$. The voltage across the auxiliary winding 8 changes sign after the instant $t_4$ and the logical device again blocks the gate 32 and opens the gate 31, but not the gate 33. At the instant $t_2'$ a third pulse is produced by the pulse shaper under the control of the voltage across the auxiliary winding 8. This pulse again renders the controlled rectifier 1 conductive through the gate 31. The controlled rectifier 2 is rendered non-conductive by this conduction and regains its cut-off property in the forward direction before the instant $t_4'$ when the voltage across the capacitor 6 again changes sign and after the end, at the instant $t_3'$, of the small reverse current peak produced by the charge carriers accumulated in the said rectifier 2.

The current $I_0$ through the choke coil 9 decreases before the instant $t_2$, but is not anulled, and increases more strongly after the instant $t_2$ and again after the instant $t_2'$ and so on. Therefore, after the first half cycle of the oscillation of the voltage across the capacitor 6, the impedance of the choke coil 9 no longer hampers the alternate charging of the capacitor 6. In fact, the current $I_0$ through said choke coil remains nearly constant and only periodically changes its path. Once it flows through the controlled rectifier 1 and the upper half of the winding 5, then it is transferred to the controlled rectifier 2 and the lower half of the winding 5, and so on.

It will be clear that the control device described can be considerably simplified. In cases where control of the power supplied to the load 7 by phase shifting of the control pulses is not necessary or desired, a very simple phase control network 24 may be used. In addition, the logical device 28 together with the gates 31, 32, 33 may have a very simple construction and may consist, for example, of only two switching transistors with time constant networks controlled by the rectified voltage of the auxiliary winding 8. The first of said transistors prevents the transfer of the first pulse produced by the pulse shaper 20 to the control transformer 16. The other transistor passes said first pulse but does not pass all the subsequent pulses to the control tranformer 17. If the frequency is not too high, every short control pulse may be applied to the respective control electrodes of the two controlled rectifiers 1 and 2 after starting, that is to say, from the second half wave of the voltage across the capacitor 6 onward. In case of higher operating frequencies, said method might cause reignitions. Therefore, the output 23 of the pulse shaper 20 may then be connected to the input of a bistable multivibrator operating as a frequency divider, and having two outputs. One of said outputs is connected through the first switching transistor of the simplified logical and gate device to the control transformer 16. The other is connected directly to the control transformer 15 and, through the other switching transistor of the logical and gate circuit, to the control transformer 17. Said bistable multivibrator also forms part of the logical and gate device.

An inverter of the type diagrammatically shown in FIGURE 1 was constructed with the following components:

Controlled rectifiers 1 and 2: Controlled semiconductor rectifiers Philips BTX 12–400R.

Controlled rectifier 3: Controlled semiconductor rectifiers Philips BTX 34–600R.

Capacitor 6: 4µf.; inductance of the winding 5: 106µh.

Inductance of the choke coil 9: 500µh.

Inductance of the coils 11 and 12: 4µh. each.

This inverter presented no starting difficulties even with full load and operated very satisfactorily at a frequency of 7.4 kc./s. with a direct supply voltage of nominally 50 volts. The power supplied to the load 7 could be raised up to 1.25 kva. at an efficiency of 90%, the operating frequency decreasing to 7.1 kc./s. The controlled rectifier 3 may be chosen of a type having a considerably smaller maximum dissipation and peak current than the controlled rectifiers 1 and 2, since this rectifier need pass only one strong current peak at every starting operation. Therefore, the use of a third controlled rectifier is practically not disadvantageous with respect to other inverters of the parallel-tuned type having only two controlled rectifiers, but which require comparatively complicated starting devices.

What is claimed is:

1. A direct current-alternating current inverter comprising, a pair of controlled rectifiers each having a control electrode and first and second electrodes that define a main current path therein, a source of direct voltage, a winding and a capacitor connected in a symmetrical parallel resonant circuit, means connecting the main current paths of said rectifiers in the forward direction between a first terminal of said direct voltage source and the respective ends of said winding, a load coupled to said parallel resonant circuit, a choke coil, means connecting said choke coil between a centre tap of said winding and the other terminal of the direct voltage source, a source of pulses coupled to said control electrodes for controlling the pair of rectifiers, said choke coil being chosen so that the inductance thereof is large with respect to the inductance of each half of the winding so that the frequency of the alternating voltage produced across the parallel resonant circuit is substantially equal to the natural frequency of said circuit, a third controlled rectifier connected in the forward direction between the end of the choke coil remote from the winding and one end of the winding, and means coupled to the control electrode of said third controlled rectifier for controlling current flow therein so that, when starting the inverter, said third controlled rectifier becomes conductive together with one controlled rectifier of the pair of rectifiers the main current part of which is connected to the other end of the winding and thus strongly accelerates the first charging of the capacitor of the parallel resonant circuit by the direct voltage source.

2. An inverter as claimed in claim 1 further comprising a gate circuit for controlling the current in said third controlled rectifier as a function of the alternating voltage produced across the parallel resonant circuit.

3. An inverter as described in claim 1 wherein said controlling means comprises, gating means including first and second gate elements intercoupled between said source of pulses and the control electrodes of the other one of said pair of rectifiers and the third controlled rectifier, respectively, and means for controlling said gate elements so that when starting the inverter said first gate element is closed and said second gate element is open.

4. An inverter as described in claim 3 further comprising means for coupling said second gate element to said parallel resonant circuit so that said second gate element is closed in response to an alternating voltage developed across said resonant circuit.

References Cited

UNITED STATES PATENTS 3,133,241   5/1964   White _____ 321—45

LEE T. HIX, *Primary Examiner.*

W. M. SHOOP, *Assistant Examiner.*